(12) United States Patent
Guemmer (10) Patent No.: US 8,382,438 B2
(45) Date of Patent: Feb. 26, 2013

(54) BLADE OF A TURBOMACHINE WITH ENLARGED PERIPHERAL PROFILE DEPTH

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 643 days.

(21) Appl. No.: 11/287,466

(22) Filed: Nov. 28, 2005

(65) Prior Publication Data
US 2006/0165520 A1     Jul. 27, 2006

Related U.S. Application Data

(63) Continuation-in-part of application No. 11/272,003, filed on Nov. 14, 2005, now abandoned.

(30) Foreign Application Priority Data

Nov. 12, 2004 (DE) .......................... 10 2004 054 752

(51) Int. Cl.
*F01D 5/14* (2006.01)
(52) U.S. Cl. ................. 416/223 R; 416/223 A; 416/243
(58) Field of Classification Search .................. 416/243, 416/223 A, 223 R; 415/115
See application file for complete search history.

(56) References Cited

U.S. PATENT DOCUMENTS

| | | | | |
|---|---|---|---|---|
| 3,809,494 A | * | 5/1974 | Redman | 416/97 R |
| 4,714,407 A | | 12/1987 | Cox | |
| 4,726,737 A | * | 2/1988 | Weingold et al. | 416/223 A |
| 4,784,575 A | * | 11/1988 | Nelson et al. | 416/226 |
| 5,167,489 A | * | 12/1992 | Wadia et al. | 415/182.1 |
| 5,249,922 A | * | 10/1993 | Sato et al. | 415/191 |
| 5,342,170 A | * | 8/1994 | Elvekjaer et al. | 415/192 |
| 5,482,433 A | * | 1/1996 | Norris et al. | 415/173.7 |
| 5,642,985 A | * | 7/1997 | Spear et al. | 416/238 |
| 6,079,948 A | * | 6/2000 | Sasaki et al. | 416/237 |
| 6,109,869 A | | 8/2000 | Maddaus et al. | |
| 6,125,626 A | * | 10/2000 | El-Aini et al. | 60/226.1 |
| 6,312,219 B1 | * | 11/2001 | Wood et al. | 415/191 |

(Continued)

FOREIGN PATENT DOCUMENTS

| | | |
|---|---|---|
| DE | 1 551 176 A | 1/1970 |
| DE | 35 30 769 A1 | 3/1986 |

(Continued)

OTHER PUBLICATIONS

European Search Report dated Dec. 22, 2008 from counterpart European patent application No. 05024869.9.

(Continued)

*Primary Examiner* — Richard Edgar
*Assistant Examiner* — Sean J Younger
(74) *Attorney, Agent, or Firm* — Timothy J. Klima; Shuttleworth & Ingersoll, PLC (57) ABSTRACT

A blade for an axial-flow turbomachine with a gap-side blade area I which transits into a free blade end and with a hub-side or casing-side blade area II, respectively. Blade 3 forms a flow line profile section with leading edge VK and trailing edge HK which establish forward end point V and rearward end point H, respectively, by a tangent normal to and intersecting with the profile chord, with the distance between these end points being profile depth L. Blade 3 includes an enlargement of profile depth L at a tip of the free blade end which is at least +10 percent and decreases to zero in the blade central section, with the values being non-negative throughout, with the profile enlargement at trailing edge HK being larger than zero at the tip in the gap-side peripheral section.

21 Claims, 8 Drawing Sheets

U.S. PATENT DOCUMENTS

| | | | |
|---|---|---|---|
| 6,416,289 B1 * | 7/2002 | Ramesh et al. | 416/235 |
| 6,508,630 B2 * | 1/2003 | Liu et al. | 416/228 |
| 6,544,564 B1 | 4/2003 | Lord | |
| 6,884,029 B2 * | 4/2005 | Beeck | 415/191 |
| 7,320,575 B2 * | 1/2008 | Wadia et al. | 416/97 R |
| 2005/0002786 A1 | 1/2005 | Franchet | |

FOREIGN PATENT DOCUMENTS

| | | |
|---|---|---|
| EP | 0661413 | 7/1995 |
| EP | 0833060 | 4/1998 |
| EP | 1106835 | 6/2001 |
| EP | 1106836 | 6/2001 |
| EP | 1 481 754 A1 | 12/2004 |
| EP | 1 505 302 A1 | 2/2005 |
| FR | 2053049 | 4/1971 |
| JP | 56069405 | 6/1981 |

OTHER PUBLICATIONS

Mural, H., Hirata, Y. and Mikashima, Y., Research on Swept-back Blades Laid Between Parallel Walls Report 1 (Experimental Research on Clark Y 11.7 % Blade with Aspect Ratio of 2.0), The Rep. Institute of High Speed Mech., Tohoku Univ., vol. 17 (1966), pp. 185-231.

U. Stark and K. Barsun, Deutsche Luft-und Raumfahrt, Forschungsbericht 69-55, Untersuchungen uber den Einfluß der Machzahl und der Pfeilung auf die Sekundarverluste in Verdichtergittern bel hohen Unterschallgeschwindlgkelten, Jun. 1969.

T. Sasaki, F. Breugelmans, Comparison of Sweep and Dihedral Effects on Compressor Cascade Performance, 1997.

* cited by examiner

BLADE OF A TURBOMACHINE WITH ENLARGED PERIPHERAL PROFILE DEPTH

This application is a continuation-in-part application of U.S. patent application Ser. No. 11/272,003, filed Nov. 14, 2005, now abandoned by the same inventor and having the same title and claiming priority to German Patent Application DE 10 2004 054 752.1 filed Nov. 12, 2004. The entirety of the US priority patent application is incorporated by reference herein. This application also claims priority to German Patent Application DE 10 2004 054 752.1 filed Nov. 12, 2004, the entirety of which is incorporated by reference herein.

BACKGROUND OF THE INVENTION

The present invention relates to blades of turbomachines, such as blowers, compressors, pumps and fans of the axial, semi-axial or radial type. The working medium (fluid) may be gaseous or liquid.

More particularly, this invention relates to at least one blade of a turbomachine. The respective blading is situated within a casing, which confines the passage of fluid through a rotor and, if applicable, a stator in the outward direction. While a rotor comprises several rotor blades attached to a rotating shaft and transfers energy to the working medium, a stator comprises several stator blades mostly fixed in the casing. In specific cases, such as propellers and fans, no casing exists.

The aerodynamic loadability and the efficiency of turbomachines, for example blowers, compressors, pumps and fans, is limited in particular by the growth and the separation of boundary layers in the area of the rotor and stator radial gaps near the walls of the annulus. The state of the art only partly provides solution to this fundamental problem. Accordingly, a bend, sweep or dihedral is imparted to the blading by way of a special shape of the blade stacking axis, for example, to positively influence the peripheral zone flow (see EP 0 661 413 A1, EP 1 106 835 A2, EP 1 106 836 A2). Also, attempts exist to improve the peripheral flow at the ends of blades with firm wall attachment by very local enlargement of the profile depth only (see EP 0 833 060 A2). Moreover, the latter concept is restricted to the same maximum profile thickness of the individual blade sections. In particular for the flow conditions at a blade end with radial gap, the known solutions are not adequate and, therefore, of limited effectiveness only.

The state of the art is disadvantageous in that the respective blade designs frequently are very complex in relation to the degree of flow improvement achievable and, with regard to the mechanical strength, can frequently only be realized in a machine if significant compromises in the form of the profile are accepted. Moreover, a profile depth enlargement limited to the gap-near blade sections, as in the state of the art, will not maximize the influence on the gap flow. This is due, in particular, to the unfavorable distribution of the shares of profile depth enlargement apportioned to the leading and trailing edges. It is also particularly attributable, however, to the small area of the blade height selected for profile depth enlargement. A run-out of the profile depth enlargement extending further into the area of the blade center does not exist. Accordingly, the state of the art provides for an improvement in efficiency and stability of the turbomachine, but to a relatively small degree only. Consequently, the possible reduction in the number of components is only small.

BRIEF SUMMARY OF THE INVENTION

A broad aspect of the present invention is to provide a rotor or stator blade of the type specified above which, while avoiding the disadvantages of the state of the art, is characterized by exercising an effective influence on the radial gap flow.

It is a particular object of the present invention to provide a solution to the above problems by a combination of the characteristics described below. Further advantageous embodiments of the present invention will become apparent from the present description.

The present invention provides for a rotor or a stator blade for application in a turbomachine whose profile depth, in relation to its base area, is enlarged towards the free blade end, with the proviso that:

i) the base area is defined by the central section and a certain part of the fixed and a certain part of the gap-side peripheral profile section,
ii) the enlargement of profile depth in the gap-side peripheral section is at least 10 percent and decreases to zero in the blade central section, with the values being constantly positive, and
iii) the profile depth enlargement occurring at the trailing edge is more than zero in the gap-side peripheral section.

The present invention, therefore, provides for variation of the profile depth of the blade beyond the base area. This variation leads to a change of the axial length effective in the respective sectional plane (flow line profile section). This results in a spatial design of the leading and trailing edge of the blade.

In the context of the present invention, enlargement of the profile depth is defined as an increase or extension of the profile depth at the free blade end, but may also mean, with negative values, a local reduction in the blade half of the fixed blade end.

BRIEF DESCRIPTION OF THE DRAWINGS

The present invention is more fully described in light of the accompanying drawings showing preferred embodiments. In the drawings, FIG. 6b shows the solution according to the present invention on a stator, view A-A of FIG. 6a.

DETAILED DESCRIPTION OF THE INVENTION

Figure 1:
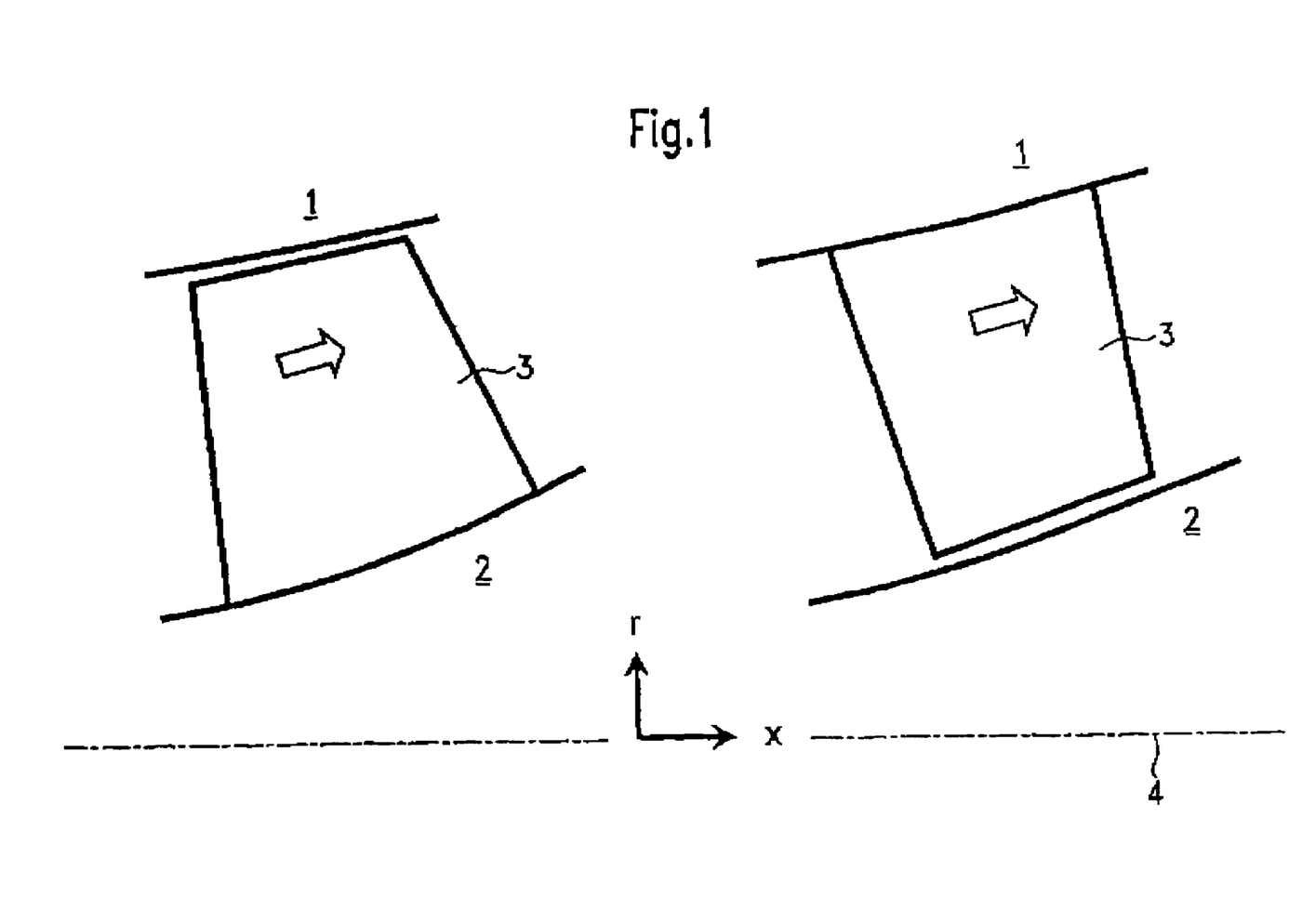
FIG. 1 is a schematic representation of blade configurations relevant to the present invention.

FIG. 1 schematically shows the two invention-relevant blade configurations in the meridional plane defined by the radial direction r and the axial direction x. Firstly, the present invention relates to a rotor with firm attachment at the hub 2 and a free blade end with radial gap at the casing 1. Analogically, the present invention relates to a stator which is firmly attached peripherally at the casing side and has a free blade end with radial gap at the hub side. As in all illustrations shown herein, inflow to the respective blade row is from left to right, as shown by the large arrow. Both the rotor blade and the stator blade are represented by reference numeral 3, as the present invention is applicable to both.

Figure 2:
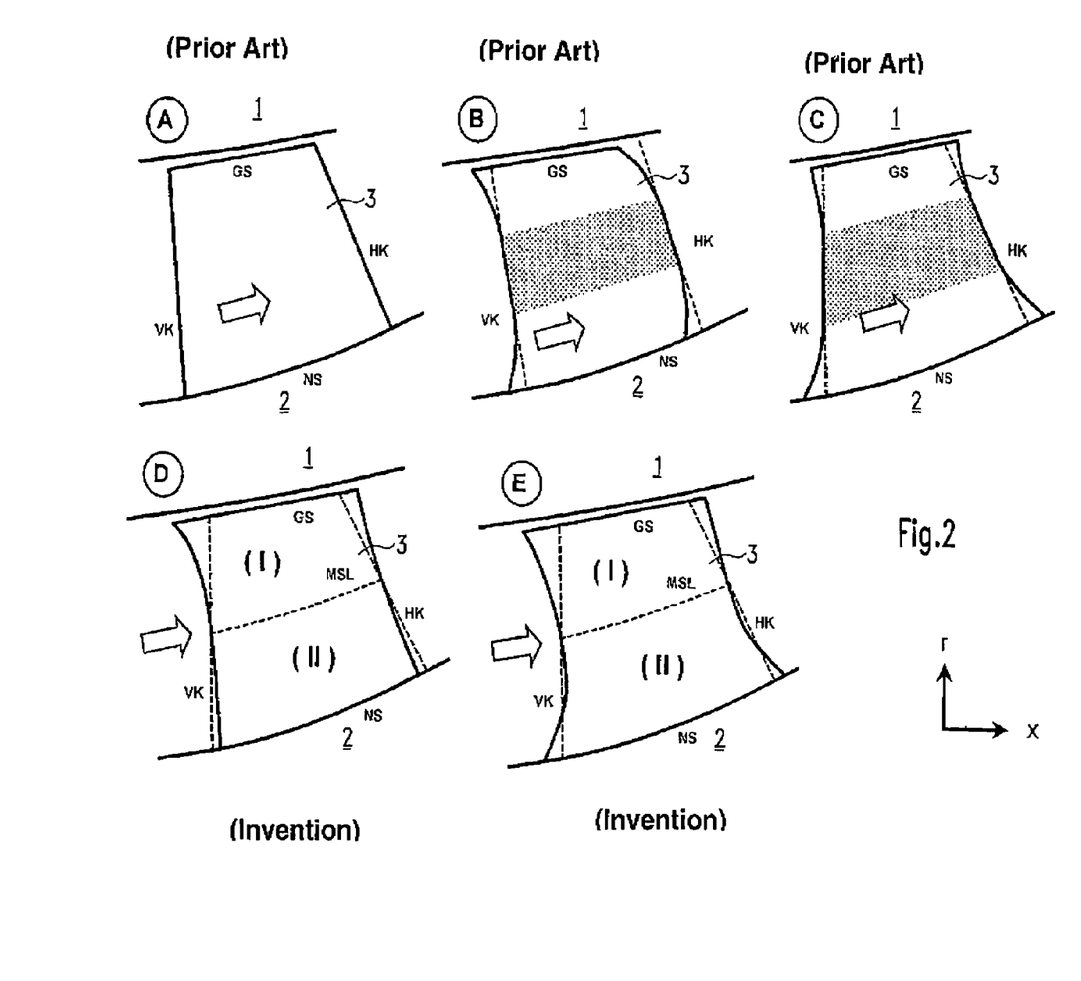
FIG. 2 is a sketch of the state of the art, showing solutions according to the present invention by taking the example of a rotor, FIG. 3 provides a definition of the meridional flow lines, FIG. 4 provides a definition and simplified representation of a flow line profile section.

FIG. 2 shows, in highly simplified representation, the state of the art and the solutions according to the present invention in the meridional plane defined by the radial direction r and the axial direction x. The representation shows, by way of example, a rotor, but representation of a stator would be analogous (in which case the positions of the free and the fixed blade end would merely have to be changed). Detail A shows a conventional rotor blade 3 with a profile depth typically decreasing in the direction of the casing 1 in this perspective. Axial curvature of the blade form produced by upstream displacement of the peripheral profile sections is a further, conventional design (detail B, the original blade shape of detail A shown in phantom in details B-E). However, the original shape of the blade 3 is here retained in a wide central area. Also state of the art are, without further context, extensions of the blade 3 in the peripheral area of the leading and trailing edge (detail C). A wide central area of unchanged profile sections exists also in this case.

For high effectiveness of profile depth enlargements, a well-balanced combination of displacement and extension of the individual profile sections is required, in particular of the gap-side profile section, see details D and E. As a requirement, the profile depth enlargement according to the present invention must be maintained in an area (I) comprising all or substantially all of the entire, gap-side blade half. The central meridional flow line MSL separates the area (I) from the area (II) which, in accordance with the present invention, may have a profile depth reduction or also a profile depth enlargement (locally or totally).

Figure 3:
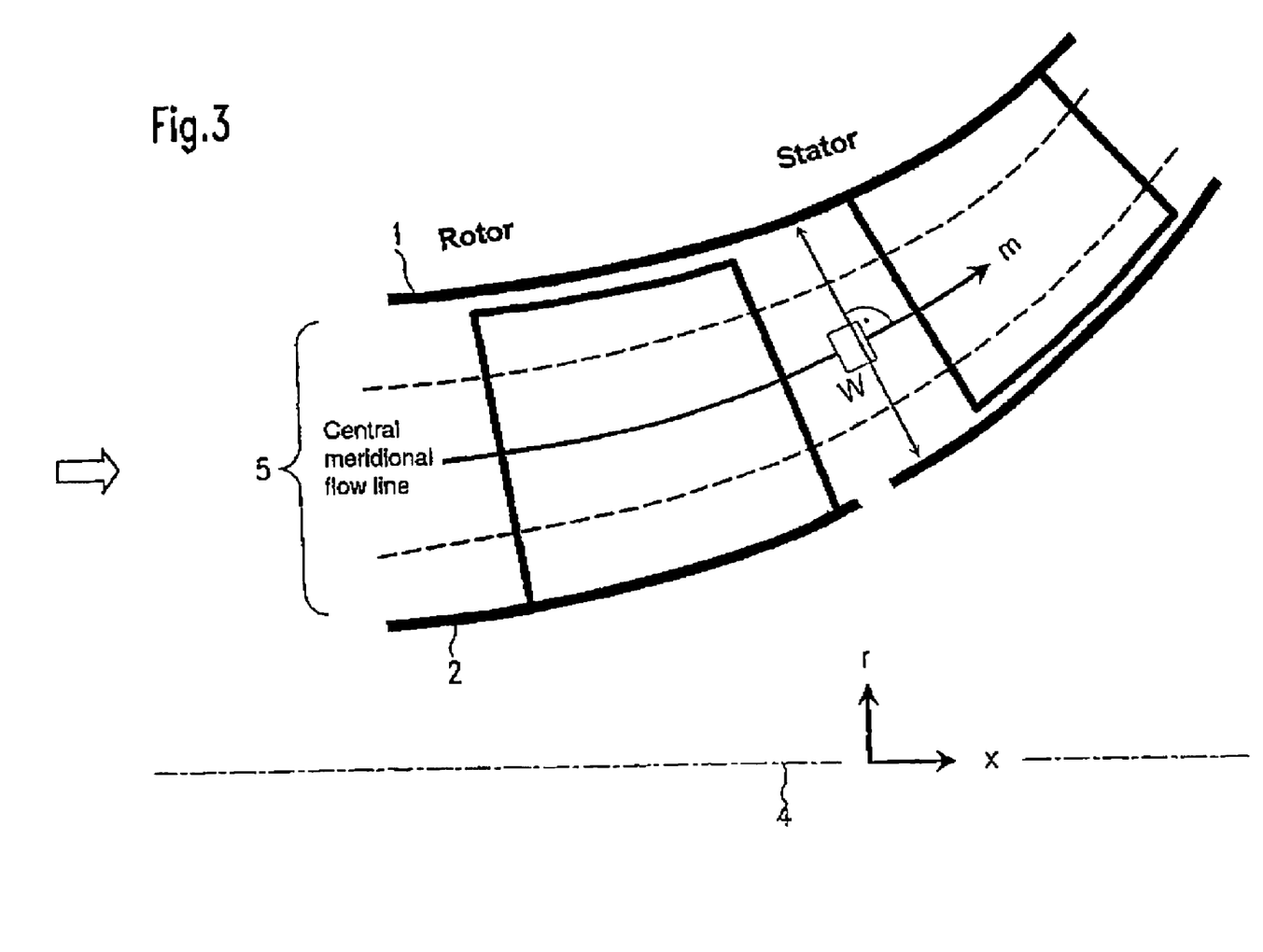

FIG. 3 provides a precise definition of the meridional flow lines and flow line sections. The central meridional flow line is established by the geometrical center of the annulus 5. If a normal is erected at any point of the central flow line, the annulus width W along the flow path and a number of normals are obtained, these enabling further meridional flow lines to be produced, with same relative division in the direction of the duct height. The intersection of a meridional flow line with a blade produces a flow line profile section.

Figure 4:
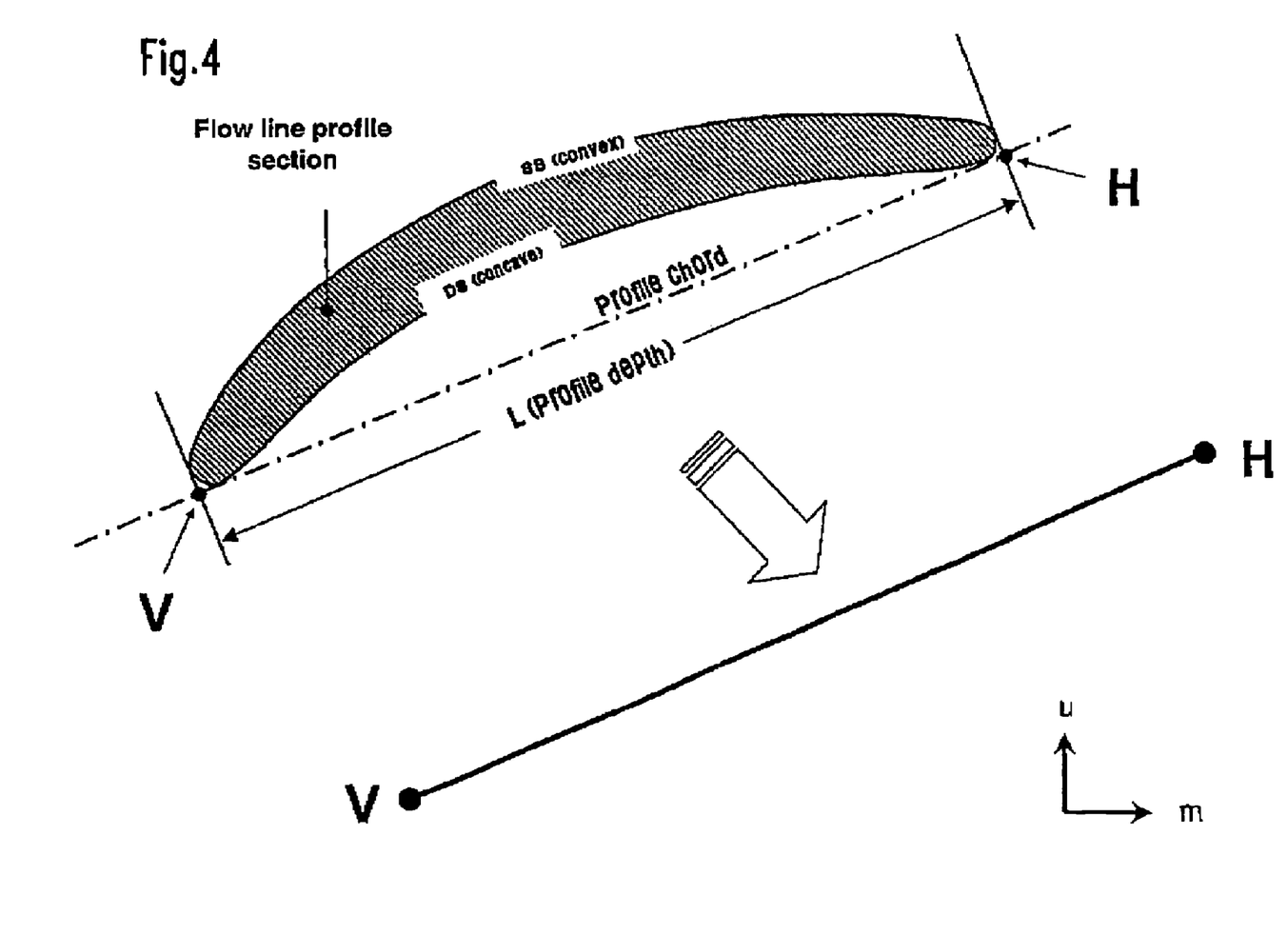

FIG. 4 shows such a flow line profile section, including the leading edge (adjacent end point V), a convex side (suction side), a concave side (pressure side) and the trailing edge (adjacent end point H). The tangent to the profile on the pressure side is called the profile chord. Two tangents normal to the profile chord at the leading and the trailing edge produce, by intersection with the chord, the two end points V and H between which the profile depth L is finally situated. For simplified, but adequate explanation of the solution according to the present invention, reference is hereinafter only made to the section of the profile chord limited by V and H for representation of blade sections.

Figure 5A:
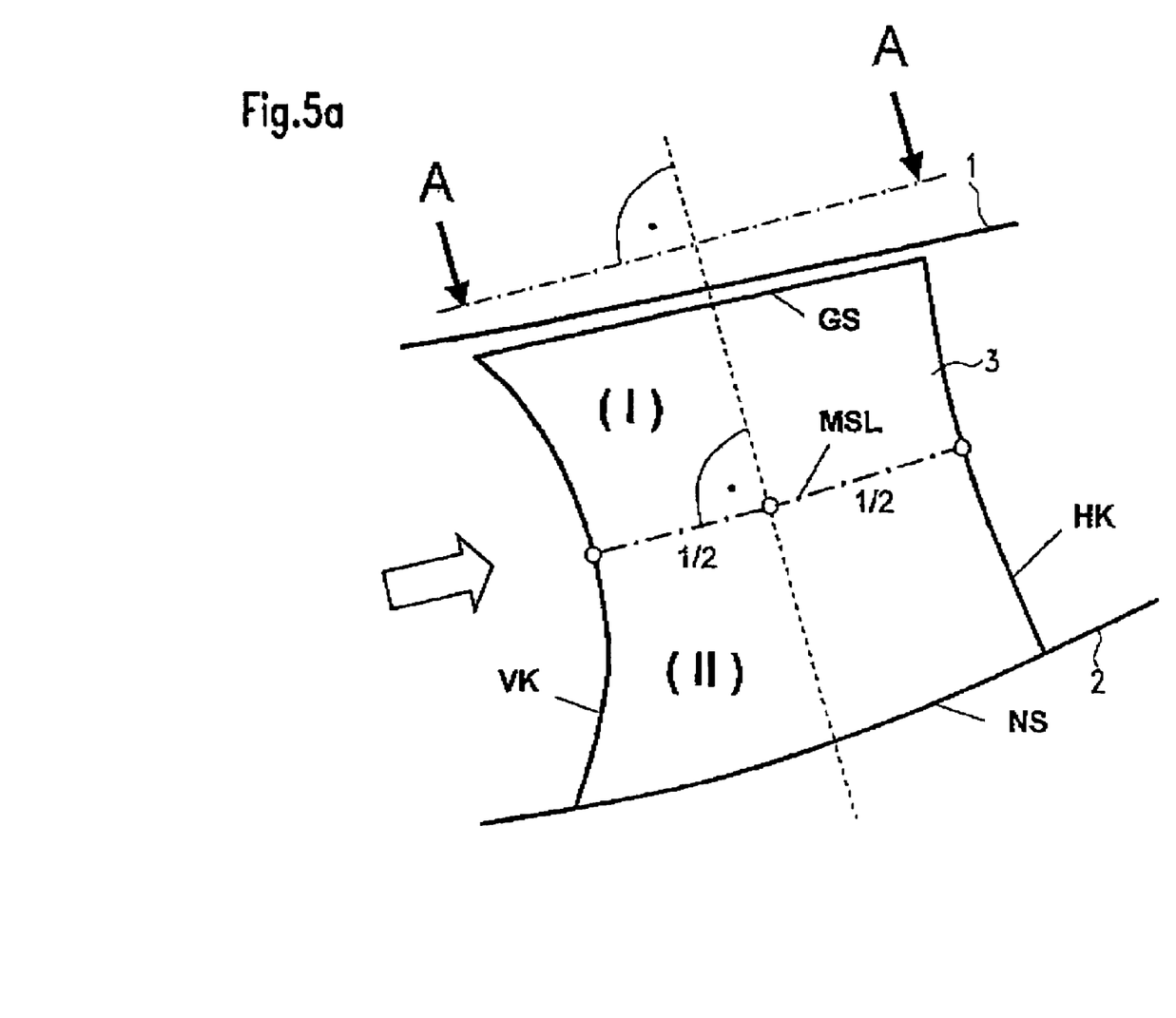
FIG. 5a shows the solution according to the present invention on a rotor, meridional view.

FIG. 5a shows the solution according to the present invention on a rotor established by the hub section NS, the casing section GS, the leading edge VK and the trailing edge HK. Also shown is the central meridional flow line MSL. Inflow is from the left-hand side. This view essentially serves for clarification of the blade form and definition of view A-A. The view A-A is parallel to the central meridional flow line MSL. A normal line erected centrally between the leading and trailing edge on the central meridional flow line MSL and situated in the meridional plane (x, r) designates this. This view includes all profile sections of a blade with almost maximal area projection. Thus, the allocation of the sections can be shown with particular clarity.

Figure 5B:
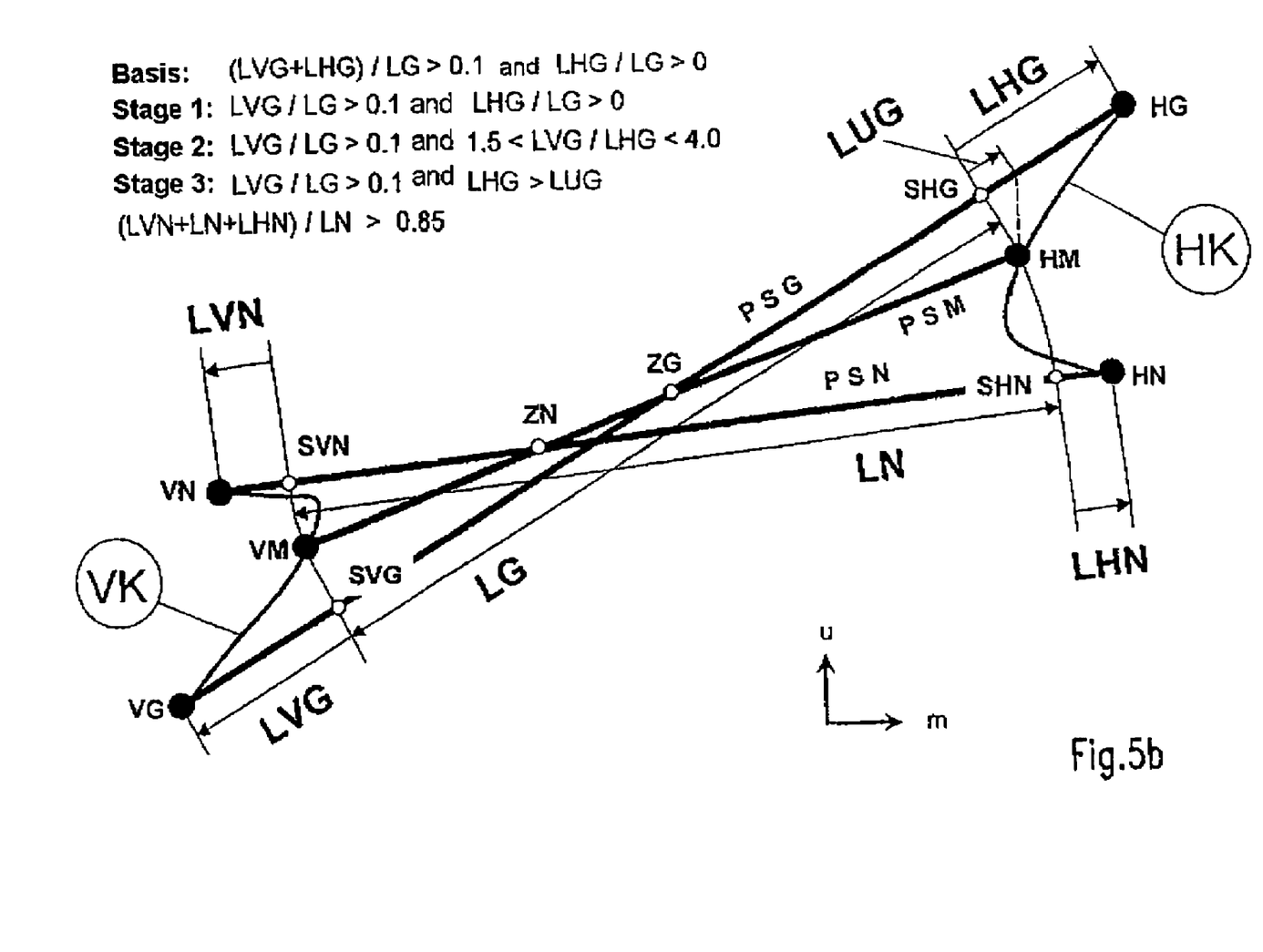
FIG. 5b shows the solution according to the present invention on a rotor, view A-A of FIG. 5a, FIG. 6a shows the solution according to the present invention on a stator, meridional view.

FIG. 5b shows, in accordance with the declared simplification, three flow line profile sections of the rotor blade. These are the hub-near (or fixed blade end) profile section PSN, the central profile section PSM and the casing-near blade tip (or free blade end) section PSG at the radial gap between the casing and the blade. The three profile sections possess the trailing-edge and leading-edge points (VN, HN), (VM, HM) and (VG, HG). The chord of PSN and the chord of PSM appear to intersect at point ZN. The PSN and PSM chords do not actually intersect one another, as each lies at a different radial distance from the axis of the turbomachine, but appear to do so at point ZN when viewed from the end. Point ZN is the center of two circular arcs of which one leads from the leading edge point VM to the point of intersection SVN and the other from the trailing edge point HM to the point of intersection SHN. The chord of PSG and the chord of PSM appear to intersect at point ZG. As with chords PSN and PSM described above, the PSG and PSM chords do not actually intersect one another, as each lies at a different radial distance from the axis of the turbomachine, but appear to do so at point ZG when viewed from the end. Point ZG is the center of two circular arcs of which one leads from the leading edge point VM to the point of intersection SVG and the other from the trailing edge point HM to the point of intersection SHG.

Points (SVN, VM, SVG) and (SHN, HM, SHG) and the circular arcs drawn between them describe the limits of the blade base area required for quantification of the profile depth enlargement according to the present invention.

Considering first the casing-near (or free blade end—the portion of the blade adjacent the blade gap) profile section PSG, the pertinent profile depth enlargements LVG and LHG are now determinable. The central length LG is fixed and equals both the length L at the central meridional flow line MSL and the fixed length LN discussed below. In accordance with the present invention, the profile depth enlargement in the casing-near profile section PSG at the gap (i.e., at the tip of the free blade end,) is defined by the following relations:

$$(LVG+LHG)/LG>0.1 \text{ and } LHG/LG>0.$$

An advantageous embodiment of the solution according to the present invention is obtained on the basis of, at the tip of the free blade end, a large profile depth increase at the leading edge according to the following design rules:

$$LVG/LG>0.1 \text{ and } LHG/LG>0.$$

A further advantageous embodiment of the solution according to the present invention is obtained on the basis of, at the tip of the free blade end, a large profile depth increase at the leading edge and allocation of a profile depth increase at the trailing edge according to the following rules, $$LVG/LG>0.1 \text{ and } 1.5<LVG/LHG<4.0.$$

One important aspect of the present invention is the provision of the profile depth enlargement across a substantial portion of the free blade end, including a profile depth enlargement of the free blade end at radially inner portions of the free blade end nearer the central meridional flow line than a radially outer tip of the free blade end. This is true whether the free blade end is adjacent the rotor hub or adjacent the casing. In a preferred embodiment, the profile depth enlargement is provided across substantially all of the free blade end (i.e., across substantially all of the distance from the tip of the free blade end to the central meridional flow line), with a portion of such profile depth enlargement exceeding 10% (at least at the tip of the free blade end, as noted above), but reaching zero at or near the central meridional flow line. If quantified, the profile depth enlargement would be provided across a minimum of 75% of the distance from the tip of the free blade end to the central meridional flow line (starting at the tip of the free blade end), more preferably across at least 90% of such distance and even more preferably across at least 95% of such distance, although in the broadest sense, the minimum distance can be any point within the range of 75-100%.

This provision of the profile depth enlargement at the radially inner portion of the free blade end substantially enhances the performance of the present invention and is not shown in the prior art. The prior art, as shown in FIG. 2C for instance, provides a profile depth enlargement only at the radially outer end of the free blade end, and does not provide a profile depth enlargement either at radially inner portions of the free blade end, or across substantially all of the free blade end.

LUG is defined along the casing-near profile chord line PSG as the distance between the point SHG and a second point occurring where PSG, in the given view of FIG. 5b, meets a circumferentially oriented line (dashed line in FIG. 5b) emerging from the central section trailing edge point HM.

A particularly advantageous embodiment of the solution according to the present invention is obtained on the basis of, at the tip of the free blade end, a large profile depth increase at the leading edge and dimensioning of a profile depth increase at the trailing edge beyond the merdional position of the central section trailing edge, wherein:

$$LVG/LG>0.1 \text{ and } LHG>LUG.$$

In all cases, the degree of profile depth enlargement in the gap-side (or free blade end) blade area (I) between PSG and PSM must, in accordance with the present invention, be greater than 0 across substantially all of the free blade end blade area and greater than or equal to 0 across any remaining blade area of the free blade end near the central meridional line, and decreasing to 0 at or near the central meridional line at PSM. This is established by the fact that the forms of the trailing and leading edge in the area (I) have no intersection with the limits of the blade base area.

Considering the hub near (or fixed blade end—the portion of the blade adjacent the hub) profile section PSN, the pertinent profile depth enlargements LVN and LHN are now determinable. In accordance with the present invention, the profile depth enlargement (or reduction) in the hub side (or fixed blade end) profile section PSN at the base of the blade is defined by the following relation:

$$(LVN+LN+LHN)/LN>0.85.$$

The degree of profile depth enlargement in the hub-near (or fixed blade end) blade area (II) at the leading and trailing edge may be positive or negative (profile depth reduction), but must fall to zero at PSM.

Figure 6A:
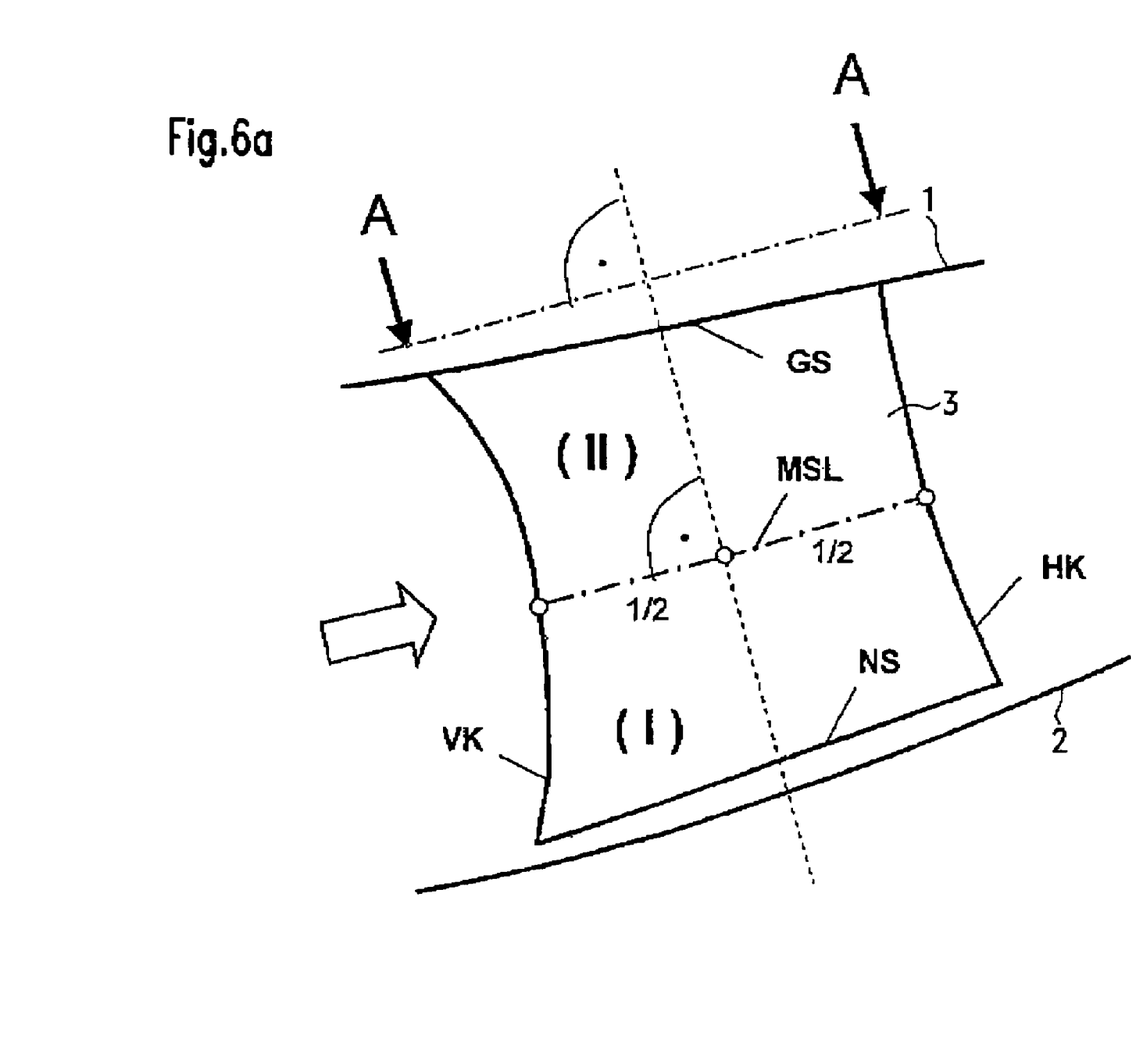

FIG. 6a shows the solution according to the present invention on a stator established by the hub section NS, the casing section GS, the leading edge VK and the trailing edge HK. Also shown is the central meridional flow line MSL. Inflow is from the left-hand side. This view essentially serves for clarification of the blade form and definition of view A-A. The view A-A is parallel to the central merdional flow line MSL. A normal line erected centrally between the leading and trailing edge on the central meridional flow line MSL and situated in the meridional plane (x, r) designates this.

Figure 6B:
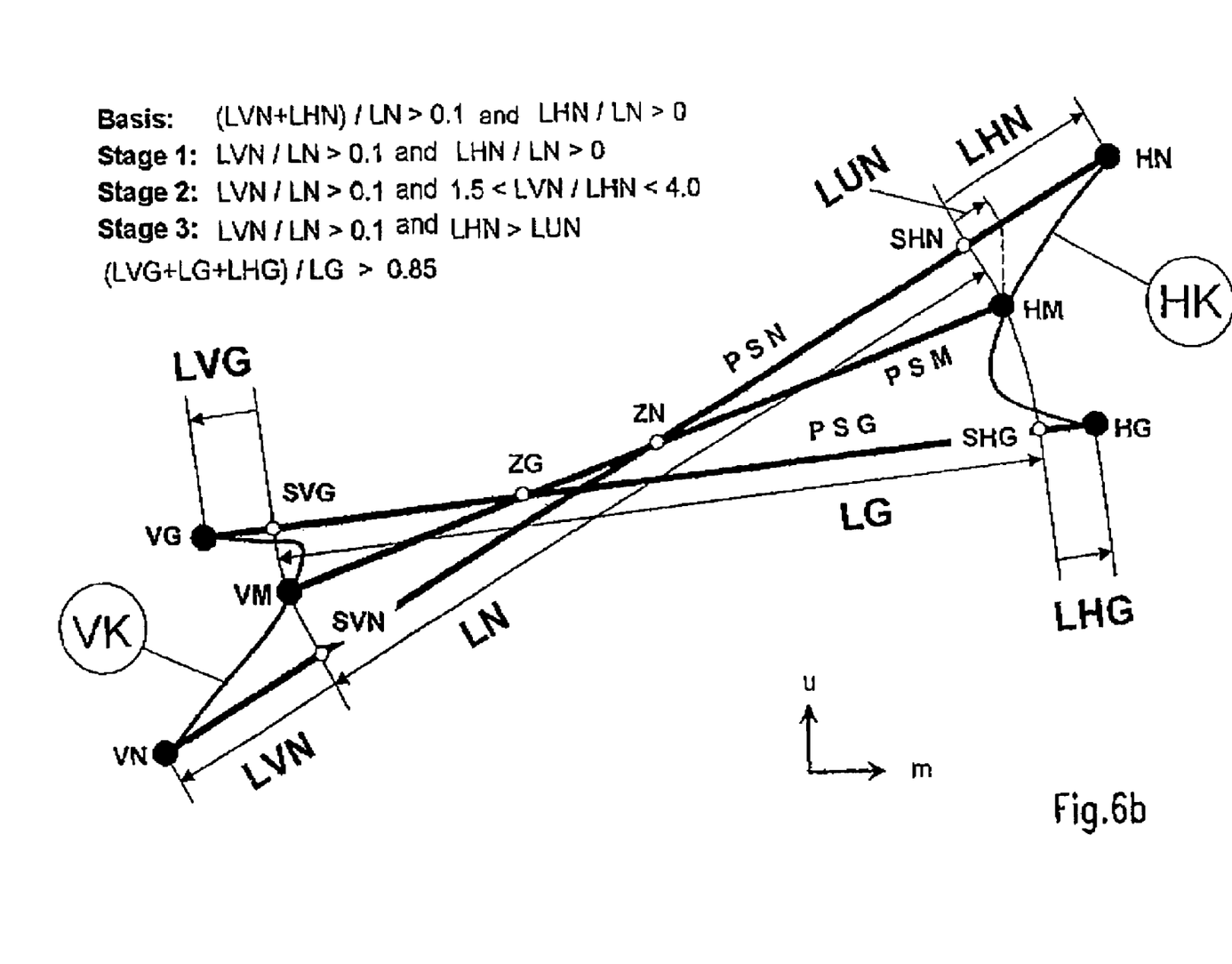

FIG. 6b shows, by analogy to FIG. 5b, three flow line profile sections of the stator blade. These are the hub-near (or free blade end) profile section PSN at the radial gap between the hub and the blade, the central profile section PSM and the casing-near (or fixed blade end) profile section PSG. The three profile sections possess the leading-edge and trailing-edge points (VN, HN), (VM, HM) and (VG, HG). The chord of PSG and the chord of PSM appear to intersect at point ZG. As described above, the PSG and PSM chords do not actually intersect one another, as each lies at a different radial distance from the axis of the turbomachine, but appear to do so at point ZG when viewed from the end. Point 75 is the center of two circular arcs of which the one leads from the leading edge point VM to the point of intersection SVG and the other from the trailing edge point HM to the point of intersection SHG. The chord of PSN and the chord of PSM appear to intersect at point ZN. As described above, the PSN and PSM chords do not actually intersect one another, as each lies at a different radial distance from the axis of the turbomachine, but appear to do so at point ZN when viewed from the end. Point ZN is the center of two circular arcs of which one leads from the leading edge point VM to the point of intersection SVN and the other from the trailing edge point HM to the point of intersection SHN. Points (SVN, VM, SVG) and (SHN, HM, SHO) and the circular arcs drawn between them describe the limits of the blade base area required for quantification of the profile depth enlargement according to the present invention.

Considering first the hub-near profile section PSN, the pertinent profile depth enlargements LVN and LHN are now determinable. As noted above, the central length LN is fixed and equals both the length L at the central meridional flow line MSL and the fixed length LG.

In accordance with the present invention, the profile depth enlargement in the hub-near (or free blade end) profile section PSN at the gap (i.e., at the tip of the free blade end) is defined by the following relations: (LVN+LHN)/LN>0.1 and LHN/LN>0.

An advantageous embodiment of the solution according to the present invention is obtained on the basis of, at the tip of the free blade end, a large profile depth increase at the leading edge according to the following rules:

$$LVN/LN>0.1 \text{ and } LHN/LN>0.$$

A further advantageous embodiment of the solution according to the present invention is obtained on the basis of, at the tip of the free blade end, a large profile depth increase at the leading edge and allocation of a profile depth increase at the trailing edge according to the following rules:

$$LVN/LN>0.1 \text{ and } 1.5<LVN/LHN<4.0.$$

LUN is defined along the hub-ear profile chord line PSN as the distance between the point SHN and a second point occurring where PSN, in the given view of FIG. 6b, meets a circumferentially oriented line (dashed line in FIG. 6b) emerging from the central section trailing edge point HM.

A particularly advantageous embodiment of the solution according to the present invention is obtained on the basis of, at the tip of the free blade end, a large profile depth increase at the leading edge and dimensioning of a profile depth increase at the trailing edge beyond the meridional position of the central section trailing edge, wherein:

$$LVN/LN>0.1 \text{ and } LHN>LUN.$$

In all cases, the degree of profile depth enlargement in the hub-near (or free blade end) blade area (I) between PSN and PSMA must, in accordance with the present invention, be greater than 0 across substantially all of the free blade end blade area and greater than or equal to 0 across any remaining blade area of the free blade end near the central meridional line, and decreasing to 0 at or near the central meridional line at PSM. This is established by the fact that the forms of the trailing and leading edge in the area (I) have no intersection with the limits of the blade base area.

Considering the casing profile section PSG, the pertinent profile depth enlargements LVG and LHG are determinable.

In accordance with the present invention, the profile depth enlargement (or reduction) in the casing-near (or fixed blade end) profile section PSG at the base of the blade is defined by the following relations: (LVG+LG+LHG)/LG>0.85.

The degree of profile depth enlargement in the casing-near (or fixed blade end) blade area (II) at the leading and trailing edge may be positive, negative (profile depth reduction) or even zero, but must fall to zero at PSM.

It is noted that the equations given above, and also given in FIGS. 5b and 6b, hold true only at the blade tip or the blade base, respectively, as noted above, and do not necessarily hold true at other radial heights of the blade.

With a blade for turbomachines, such as blowers, compressors, pumps and fans, according to the present invention, a peripheral flow influence is achieved which is capable of increasing the efficiency of each stage by approximately 1 percent, with stability remaining unchanged. In addition, a reduction of the number of blades of up to 20 percent is possible. The concept according to the present invention is applicable to different types of turbomachines and, depending on the degree of utilization of the concept, yields savings in cost and weight of the turbomachine of 2 to 10 percent. In addition, the overall efficiency of the turbomachine is increased up to 1.5 percent, depending on the application.

LIST OF REFERENCE NUMERALS

1 Casing
2 Hub
3 Blade
4 Machine axis
5 Annulus

What is claimed is:

1. A stator/rotor blade for a fluid-flow machine, the blade having a free blade end blade area adjacent to a tip clearance gap positioned between a blade tip and a main gas path boundary of one of a hub and a casing, and a fixed blade end blade area structurally connected to the main gas path boundary of one of the hub and the casing, the blade transmitting energy to the working fluid and being cambered to turn flow from high relative whirl to lower relative whirl, the blade being defined by flow line profile sections with a leading edge and a trailing edge which establish a forward end point and a rearward end point, respectively, each given by a tangent normal to and intersecting with a respective profile chord, with a distance between these end points being a respective profile depth, and the free end blade area and the fixed end blade area meeting at a central meridional flow line profile of the blade, the blade having an enlargement of the profile depth at the free blade end blade area which, in relation to a profile depth of the blade at a central meridional flow line of the blade, is at least +10 percent at a tip of the free blade end blade area and decreases to zero by the central meridional flow line of the blade, with the enlargement values being $\geq 0$ throughout, the profile depth enlargement being provided across substantially all of a length of the free blade end blade area and continuously increasing in a continuous concave curve from the central meridional flow line to the tip of the free end blade area on each of the leading edge and the trailing edge to provide structural stress and aerodynamic loading continuity across the blade length, the profile depth enlargement sized to avoid local distortion of the blade leading edge and trailing edge shape meridional projections, the profile depth enlargement at the trailing edge of the tip of the free blade end blade area being >0.

2. A blade in accordance with claim 1, wherein the fixed blade end blade area includes a profile depth reduction over at least a portion thereof, as compared to the profile depth of the blade at the central meridional flow line of the blade.

3. A blade in accordance with claim 2, wherein the fixed blade end blade area includes a profile depth enlargement over at least a portion thereof, as compared to the profile depth of the blade at the central meridional flow line of the blade.

4. A blade in accordance with claim 3, wherein the fixed blade end blade area has a profile depth at its base of greater than 85%, as compared to the profile depth of the blade at the central meridional flow line of the blade.

5. A blade in accordance with claim 1, wherein the profile depth enlargement at the leading edge of the tip of the free blade end blade area is at least +10 percent, as compared to the profile depth of the blade at the central meridional flow line of the blade.

6. A blade in accordance with claim 5, wherein the ratio of the profile depth enlargement of the leading edge to the trailing edge at the tip of the free blade end blade area is between 1.5 to 4.0.

7. A blade in accordance with claim 6, wherein the profile depth enlargement at the tip of the free blade end blade area results in a trailing edge of the blade at the free blade end blade area which, in the meridional direction, is further downstream in the turbomachine than the trailing edge of the blade at the central meridional flow line of the blade.

8. A blade in accordance with claim 5, wherein the profile depth enlargement at the tip of the free blade end blade area results in a trailing edge of the blade at the free blade end blade area which, in the meridional direction, is further downstream in the turbomachine than the trailing edge of the blade at the central meridional flow line of the blade.

9. A blade in accordance with claim 1, wherein the fixed blade end blade area includes a profile depth reduction over at least a portion thereof, as compared to the profile depth of the blade at the central meridional flow line of the blade, and the fixed blade end blade area has a profile depth at its base of greater than 85%, as compared to the profile depth of the blade at the central meridional flow line of the blade.

10. A blade in accordance with claim 5, wherein the fixed blade end blade area includes a profile depth reduction over at least a portion thereof, as compared to the profile depth of the blade at the central meridional flow line of the blade, and the fixed blade end blade area has a profile depth at its base of greater than 85%, as compared to the profile depth of the blade at the central meridional flow line of the blade.

11. A blade in accordance with claim 6, wherein the fixed blade end blade area includes a profile depth reduction over at least a portion thereof, as compared to the profile depth of the blade at the central meridional flow line of the blade, and the fixed blade end blade area has a profile depth at its base of greater than 85%, as compared to the profile depth of the blade at the central meridional flow line of the blade.

12. A blade in accordance with claim 7, wherein the fixed blade end blade area includes a profile depth reduction over at least a portion thereof, as compared to the profile depth of the blade at the central meridional flow line of the blade, and the fixed blade end blade area has a profile depth at its base of greater than 85%, as compared to the profile depth of the blade at the central meridional flow line of the blade.

13. A blade in accordance with claim 8, wherein the fixed blade end blade area includes a profile depth reduction over at least a portion thereof, as compared to the profile depth of the blade at the central meridional flow line of the blade, and the fixed blade end blade area has a profile depth at its base of greater than 85%, as compared to the profile depth of the blade at the central meridional flow line of the blade.

14. A blade in accordance with claim 1, wherein the fixed blade end blade area includes a profile depth enlargement over at least a portion thereof, as compared to the profile depth of the blade at the central meridional flow line of the blade.

15. A blade in accordance with claim 14, wherein the profile depth enlargement at the leading edge of the tip of the free blade end blade area is at least +10 percent, as compared to the profile depth of the blade at the central meridional flow line of the blade.

16. A blade in accordance with claim 15, wherein the ratio of the profile depth enlargement of the leading edge to the trailing edge at the tip of the free blade end blade area is between 1.5 to 4.0.

17. A blade in accordance with claim 16, wherein the profile depth enlargement at the tip of the free blade end blade area results in a trailing edge of the blade at the free blade end blade area which, in the meridional direction, is further downstream in the turbomachine than the trailing edge of the blade at the central meridional flow line of the blade.

18. A blade in accordance with claim 1, wherein the profile depth continues from the free blade end blade area past the central meridional flow line into the fixed blade end blade area in a continuous concave curve on each of the leading and trailing edges to create a profile depth reduction on each of the leading and trailing edges over at least a portion of the fixed blade end blade area adjacent the central meridional flow line, and then continues in a continuous concave curve on each of the leading and trailing edges to create a profile depth enlargement on each of the leading and trailing edges at a base of the fixed blade end blade area, as compared to the profile depth of the blade at the central meridional flow line of the blade.

19. A blade in accordance with claim 18, wherein the blade is a rotor blade.

20. A blade in accordance with claim 1, wherein the blade is a rotor blade.

21. A method for positively influencing a radial gap flow for a free blade end of a stator/rotor blade for a fluid-flow machine, comprising:

providing a blade having:
  a free blade end blade area adjacent to a tip clearance gap positioned between a blade tip and a main gas path boundary of one of a hub and a casing, and
  a fixed blade end blade area structurally connected to the main gas path boundary of one of the hub and the casing,
the blade transmitting energy to the working fluid and being cambered to turn flow from high relative whirl to lower relative whirl,
the blade being defined by flow line profile sections with a leading edge and a trailing edge which establish a forward end point and a rearward end point, respectively, each given by a tangent normal to and intersecting with a respective profile chord, with a distance between these end points being a respective profile depth, and the free end blade area and the fixed end blade area meeting at a central meridional flow line profile of the blade,
the blade having an enlargement of the profile depth at the free blade end blade area which, in relation to a profile depth of the blade at a central meridional flow line of the blade, is at least +10 percent at a tip of the free blade end blade area and decreases to zero by the central meridional flow line of the blade, with the enlargement values being $\geqq 0$ throughout,
reducing losses due to radial gap flow, and providing structural stress and aerodynamic loading continuity across the blade length, by providing the profile depth enlargement across substantially all of a length of the free blade end blade area and continuously increasing the profile depth enlargement in a continuous concave curve from the central meridional flow line to the tip of the free end blade area on each of the leading edge and the trailing edge, sizing the profile depth enlargement to avoid local distortion of the blade leading edge and trailing edge shape meridional projections, the profile depth enlargement at the trailing edge of the tip of the free blade end blade area being >0.

* * * * *